United States Patent [19]

Kerres

[11] Patent Number: 4,704,957
[45] Date of Patent: Nov. 10, 1987

[54] APPARATUS FOR OPERATING A SMOKING CHAMBER

[76] Inventor: Siegfried M. Kerres, Im Lerchenberg 20, 7057 Winnenden 5, Fed. Rep. of Germany

[21] Appl. No.: 753,642

[22] Filed: Jul. 10, 1985

[30] Foreign Application Priority Data

Aug. 8, 1984 [DE] Fed. Rep. of Germany ....... 3429266

[51] Int. Cl.⁴ .......................... A23L 3/32; A23B 4/04
[52] U.S. Cl. ....................................... 99/451; 99/476; 99/481; 99/482
[58] Field of Search .......... 99/451, 467, 468, 473–476, 99/482, 481, 312; 426/235, 236, 314, 315

[56] References Cited

U.S. PATENT DOCUMENTS 3,634,108  1/1972  Fessmann .................... 99/451 X
4,250,804  2/1981  Saurenman ..................... 99/451
4,344,358  8/1982  Maurer ........................ 99/482

Primary Examiner—Timothy F. Simone
Attorney, Agent, or Firm—Merchant, Gould, Smith, Edell, Welter & Schmidt

[57] ABSTRACT

A method and an apparatus for operating a smoke house or smoking chamber is described in which the smoke density is reduced in order to reduce the amount of carbon in the exhausted smoke, and in which the smoking quality is retained by exerting thrusting pulses on the smoke particles present in the chamber, at least in the area of the products to be smoked, with the thrusting pulses accelerating the particles, in particular towards the products to be smoked.

7 Claims, 1 Drawing Figure

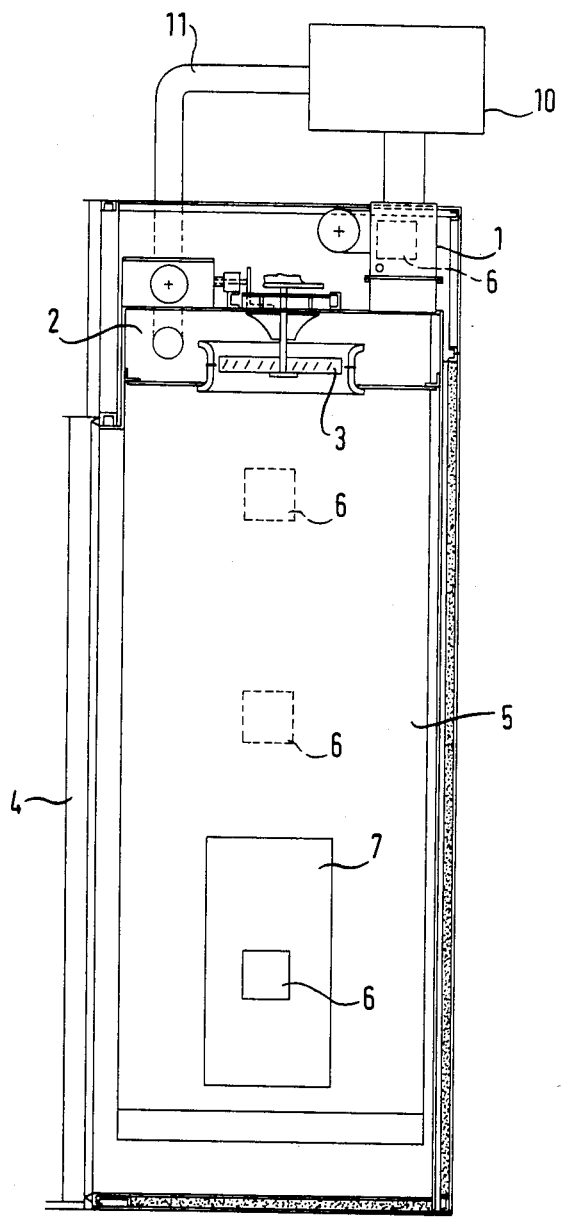

APPARATUS FOR OPERATING A SMOKING CHAMBER

TECHNICAL FIELD

The invention relates to a method of operating a smoke house or smoking chamber wherein smoke introduced into the chamber is passed over the products to be smoked, which are located in the chamber, and also to an apparatus for carrying out this method.

BACKGROUND OF THE INVENTION

Smoking chambers are known in the form of open systems and in the form of closed systems. In the open systems the smoke is supplied substantially continuously to the respective chamber and is removed again from the chamber via an outlet after circulation. In the closed or substantially closed systems the smoke is guided in a circuit for predeterminable time intervals, which results in a corresponding increase in the smoke concentration.

These known systems can be operated with smoulder smoke (in German "Glimmrauch") typically using a sawdust smoke generator, with friction smoke (in German "Reibrauch") and also with steam smoke (in German "Dampfrauch"). The direction of flow of smoke produced by various smoke generating systems can be reversed in the smoke house from time to time. The smoked effect which is sought results from condensation effects in conjunction with the impingement of the smoke particles on the products to be smoked. These processes influence the colour and taste of the particular products which are located in the smoke house.

A problem in all known types of smoke houses is the fact, in particular having regard to the regulations for the protection of the environment, that exhausted smoke with a high carbon content is created and is led into the outside environment, with it being particularly unfavourable that in many cases it is necessary to operate with a relatively high smoke density in order to obtain the desired smoked effect.

The principal object underyling the invention is thus to substantially reduce the smoke density in the smoke house, and thereby to also largely overcome the air pollution problem originating from exhausted smoke, while retaining the smoking paper, i.e. the efficiency of the relevant smoke house with regard to the effects on the taste and colour of the particular products.

This object is satisfied, in accordance with the invention, essentially in that the smoke particles are subjected to thrusting pulses, at least in the area of the products to be smoked, which accelerate the particles, in particular towards the products to be smoked.

BRIEF DESCRIPTION OF THE DRAWING

An example of an apparatus in accordance with the invention is illustrated in the drawing, which shows a highly schematic sectional view of a smoking chamber or smokehouse.

DESCRIPTION OF THE PREFERRED EMBODIMENT

The measures to be effected in accordance with the invention ensure that the number of the impingement processes of the smoke particles onto the products to be smoked, which are essential to influence the colour and flavour of the products to be smoked, are decisively increased in comparison to the previously known methods which in turn makes it possible to greatly reduce the smoke concentration and to use particularly favourable mixing ratios of smoke and air. The reduction of the smoke concentration leads to a decisive reduction of the carbon content of the exhaust gases and thus makes it possible to operate smoking systems in an environmentally friendly manner.

Particles of steam or vapor present in the chamber are also preferably accelerated by exciting them pulsewise in addition to the smoke particles. This pulsewise excitation can take place by alternating electrical fields or by electromagnetic and/or electropneumatic oscillators.

The colour and aroma of the articles to be smoked can be intentionally and ideally influenced with a minimum of smoke and an optimum quantity of air, and indeed both during cold smoking with dry smoke, during hot smoking with dry smoke and also during cold and hot smoking with adjustable relative humidity.

The particles are preferably excited at the same frequency, it is however also possible to generate thrusting pulses with different frequencies from different oscillators and it has proved favourable to make the choice such that at least the larger smoke particles are broken down into several smaller smoke particles. This comminution of the particles is again beneficial, particularly with regard to the smoking effect which can be achieved.

A preferred apparatus for carrying out the method of the invention comprises a chamber which can be loaded with the products to be smoked, a smoke generator which communicates with the internal space of the chamber and at least one outlet, and provision is made, in accordance with the invention, that at least one excitation member of an oscillation generator is arranged in the internal space of the chamber and/or in at least one supply or outlet duct communicating with the internal space of the chamber. If the excitation member is arranged in an exhaust duct then the relevant arrangement is a closed or quasi-closed system.

The excitation members are expediently formed by regions of the chamber walls and/or by wall regions of devices provided in the internal space of the chamber. An arrangement which is particularly advantageous from a constructional viewpoint is obtained by integrating the excitation members into the wall regions.

For the purpose of optimising the action of the excitation members these can be constructed so that at least some of them are adjustable in space.

In accordance with a further embodiment of the invention several excitation members are provided which can be selectively operated either simultaneously or alternately, and indeed also at different frequencies of oscillation.

The provision, in the internal space of the chamber, of at least one electrostatic unit which is operated simultaneously or alternately with the oscillation generators also has a beneficial effect on the results of the smoking.

Furthermore, it is of advantage to provide a microwave unit which acts on the products to be smoked, in particular when using a chamber operating continuously or in throughflow operation and/or when using a throughflow tunnel.

The internal space 5 of the smoke house is accessible via a door 4 and can be loaded with the products to be smoked, for example by moving a carriage into the chamber.

Smoke generated by an external smoke generator 10 is supplied via a smoke inlet 1. The extraction or exhaust of the smoke from the space 5 takes place via a fan 3 which communicates on the pressure side with a chamber 2. The exhaust duct can lead into the atmosphere from this chamber 2, it is however also possible in the same manner to effect a return flow of smoke, via the smoke generator 10, for example by a duct 11.

At least one excitation member 6 which communicates with an oscillation generator 7 is located in the internal space 5 of the smoke house. The excitation member and the oscillation generator are only schematically illustrated.

It is noted that the excitation can be accomplished at different frequencies and in particular those outside of the human ear. Excitation can be selected so that the larger smoke particles are broken down into several smaller particles. The particles are preferably sucked out of the chamber from time to time and a proportion of them are returned to the chamber in a turbulent state.

The excitation members (i.e., oscillation generators such as electromagnetic or electropneumatic) 6 are formed by regions of the chamber wall and/or by wall regions of devices provided within the internal space of the chamber. Some of the excitation members or the oscillation generators therefore may be arranged so as to be adjustable as to spacial location. A bypass of subsidiary path can be provided in the circuit which recirculates the smoke particles and an excitation member 6 may be located therein. At least some of the excitation members may be integrated into the chamber floor or ceiling. The excitation members may be operated simultaneously or alternately. The chambers may be bounded in some regions by walls which have a plurality of apertures. Rooms or spaces fed with smoke are provided behind these apertures and the smoke is supplied pulse wise by the openings to the internal space of the chamber.

I claim:

1. Apparatus for smoking products comprising a chamber having an internal space which can be loaded with the products to be smoked; a smoke generator connected with said internal space of said chamber for supplying smoke particles to said internal space; and an oscillation generator comprising an electromagnetic oscillator having at least one excitation member, said at least one excitation member being disposed in said internal space for subjecting said particles of smoke to thrusting sonic pulses, at least in the area of said products to be smoked, whereby said smoke particles are accelerated towards said products to be smoked.

2. Apparatus in accordance with claim 1, characterised in that a plurality of excitation members (6) which are substantially symmetrically distributed relative to the products to be smoked are provided in the internal space (5) of the chamber.

3. Apparatus in accordance with claim 2, characterised in that the excitation members are operated synchronously.

4. Apparatus in accordance with claim 1, characterised in that at least one electrostatic unit which is operated simultaneously or alternately with the oscillation generators is provided in the internal space (5) of the chamber.

5. Apparatus for smoking products comprising a chamber having an internal space which can be loaded with the products to be smoked; a smoke supply duct connected with said internal space; a smoke outlet duct from said internal space; a smoke generator communicating with said internal space via said smoke supply duct for directing smoke particles into said internal space; and an oscillation generator comprising an electromagnetic oscillator having an excitation member, said excitation member being disposed in one of said smoke supply and outlet ducts for subjecting said particles of smoke to thrusting sonic pulses, whereby said smoke particles are accelerated towards said products to be smoked.

6. Apparatus for smoking products comprising a chamber having an internal space which can be loaded with the products to be smoked; a smoke generator connected with said internal space of said chamber for supplying smoke particles to said internal space; and an oscillation generator comprising an electropneumatic oscillator having at least one excitation member, said at least one excitation member being disposed in said internal space for subjecting said particles of smoke to thrusting sonic pulses, at least in the area of said products to be smoked, whereby said smoke particles are accelerated towards said products to be smoked.

7. Apparatus for smoking products comprising a chmaber having an internal space which can be loaded with the products to be smoked; a smoke supply duct connected with said internal space; a smoke outlet duct from said internal space; a smoke generator communicating with said internal space via said smoke supply duct for directing smoke particles into said internal space; and an oscillation generator comprising an electropneumatic oscillator having an excitation member, said excitation member being disposed in one of said smoke supply and outlet ducts for subjecting said particles of smoke to thrusting sonic pulses, whereby said smoke particles are accelerated towards said products to be smoked.

* * * * *

UNITED STATES PATENT AND TRADEMARK OFFICE
CERTIFICATE OF CORRECTION

PATENT NO. : 4,704,957

DATED : 10 November 1987

INVENTOR(S) : Siegfried M. Kerres

It is certified that error appears in the above-identified patent and that said Letters Patent is hereby corrected as shown below:

Column 1, line 41, "underyling" should be --underlying--.

Column 1, line 45, "paper" should be --power--.

Column 2, line 40, after "members", insert --(i.e., oscillation generators such as electromagnetic or electropneumatic)--.

Column 3, line 19, after "members" delete "(i.e., oscillation generators such as electromagnetic or electropneumatic)".

Column 4, line 39, "chmaber" should be --chamber--.

Signed and Sealed this

Thirty-first Day of May, 1988

Attest:

DONALD J. QUIGG

Attesting Officer

Commissioner of Patents and Trademarks